United States Patent [19]

Mulock Houwer

[11] 4,136,789

[45] Jan. 30, 1979

[54] CONVEYING, STORAGE AND SORTING SYSTEM FOR LARGE METAL SHEETS, PARTICULARLY FOR USE IN SHIPBUILDING

[75] Inventor: Johan H. Mulock Houwer, Middelburg, Netherlands

[73] Assignee: B.V. Koninklijke Maatschappij "De Schelde", Vlissingsen, Netherlands

[21] Appl. No.: 777,668

[22] Filed: Mar. 15, 1977

[30] Foreign Application Priority Data

Mar. 16, 1976 [NL] Netherlands .................. 7602745

[51] Int. Cl.² ........................................... B65G 63/04
[52] U.S. Cl. ................................. 214/16 B; 212/14;
214/6 FS; 294/65.5
[58] Field of Search .................. 214/1 S, 6 FS, 16 B,
214/16.4 B, 87, 88, 515, 621, 394, 16.1 CE;
294/65.5; 212/14; 114/65 R

[56] References Cited

U.S. PATENT DOCUMENTS

| 2,609,954 | 9/1952 | Sutherland et al. | 214/658 |
| 3,066,814 | 12/1962 | Christiansen | 214/394 X |
| 3,294,260 | 12/1966 | Frangos | 214/16.1 CE |
| 3,805,978 | 4/1974 | Hahne | 294/65.5 X |
| 3,866,767 | 2/1975 | Zollinger et al. | 214/16.4 B |

FOREIGN PATENT DOCUMENTS 209150 11/1966 Sweden ................................. 294/65.5

Primary Examiner—L. J. Paperner
Attorney, Agent, or Firm—Bucknam and Archer

[57] ABSTRACT

A handling and storage system for large metal sheets in which a magnet vehicle equipped with magnetic grippers and a sheet collector conveys sheets to and from storage locations in passages between pairs of rails. A transfer vehicle that travels along a path crosswise to the rails carries the magnet vehicle from any one pair of rails to another for travel thereover, thereby providing access to all storage locations.

4 Claims, 6 Drawing Figures

CONVEYING, STORAGE AND SORTING SYSTEM FOR LARGE METAL SHEETS, PARTICULARLY FOR USE IN SHIPBUILDING

The invention relates to a conveying, storage and sorting system for large metal sheets of various size, particularly for use in ship-building, comprising a covered or uncovered storage yard for the sheets and lifting and conveying means for the purpose of depositing the sheets in a certain place of the storage yard and removing them again, if required, for further processing. Such a system is indeed known in practice. The sheets, which are usually supplied by ship or, as the case may be, by rail, are then unloaded by a crane and deposited on the quay. A portal crane with a magnet beam and bridging a storage yard or a shed will then distribute the sheets one by one over the area of the yard or the shed according to size or to that section of the ship for which they are intended.

When a certain sheet is required, this sheet is lifted again and taken to a conveyor which will provide for supply to the ship-yard.

Such a system has various disadvantages.

The crane is adequate for a certain area of the storage yard only. Extension of the storage yard in certain directions will require a reconstruction of the crane or even a new crane. The crane can convey only one sheet at a time. Consequently, this takes much time when the sheets are carried off again. Generally, a number of sheets in various sizes but belonging to a particular section of the ship under construction are piled in the storage yard. Now, when a certain sheet from the stack should be used first, the sheets lying on top will have to be removed temporarily. This will require extra sorting capacity.

The invention aims at providing a system lacking the aforesaid disadvantages. According to the invention, this is achieved in that the storage yard comprises at least one rectangular surface consisting of a number of parallel passages, each of which is fitted with rails for the support of a vehicle movable over each passage, a so-called magnet vehicle, which can lower a sheet into the space between the wheels on to the floor between the rails by means of magnetic grippers or the like, that a set of rails is mounted on at least one side of the or of each surface perpendicularly to the rails first mentioned, for the support of a vehicle movable over said rails, a so-called transfer vehicle, with an open frame having wheels at its lower side, by means of which the transfer vehicle can move over the rails and bearing rail sections at its upper side to receive the magnet vehicle, and that one or more so-called sheet collectors are present, each consisting of a supporting frame which can rest between the rails at any point in the passages and can be lifted to above the rails by the magnet vehicle to be displaced with the magnet vehicle.

After the sheets have been unloaded, further conveyance and depositing in the required place is effected by means of vehicles, as a result of which no large portal crane will be required. If the storage yard or the shed should be extended, this will be possible by all means.

Due to the use of magnet vehicles and of one or more transfer vehicles, any point of any passage will be within reach.

Due to the use of sheet collectors it will be possible to pile a certain required combination and to carry this to the ship-yard as a stack. The succession in the stack, too, can be as required. For that purpose, the sheet collectors are set up in a certain passage. If, for instance, two sheet collectors are employed, the collector not intended for conveyance can be used as a temporary storage for the non-required sheets during piling.

Since the sheet collector is situated over the other stacks in the passage in question, no separate sorting space will be required.

The invention will now be further illustrated by means of the drawing for an exemplary embodiment, in which.

Figure 1:
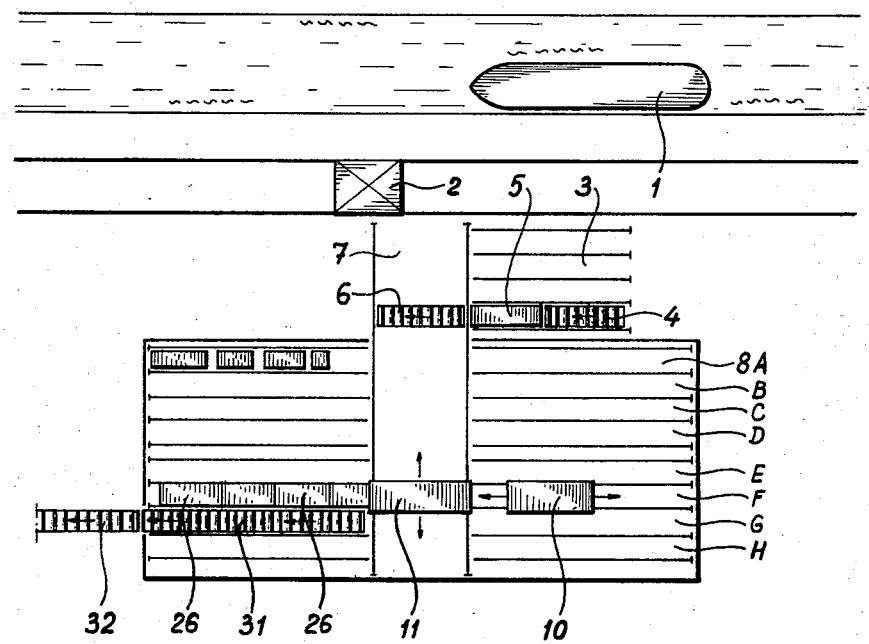
FIG. 1 is a ground plate of a dock area with a system according to the invention.

The dock area according to FIG. 1 covers a berth for a ship 1 with which sheets are supplied. A schematic view of a quay crane is given at 2, which crane transfers the sheets from the ship 1 to a buffer point 3. From the buffer point 3, the sheets are transferred one by one to a roller conveyor 4 and passed through a measuring and marking system 5. In this measuring and marking system, the dimensions and the like of the sheets supplied are measured and the sheets are marked with one or more code characters. The date of the measuring and marking system can be introduced into a computer, as will be described further on.

Thereupon, each sheet will land upon a short roller conveyor 6 situated in a passage 7 of a storage shed 8.

In the example represented, the storage shed consists of two sections with the passage 7 as an intermediate. Of course, the storage shed 8 may also be made up of one single section with the passage 7 at an end.

The storage shed 8 is subdivided in any given number of passages, marked here with A to H.

Figure 2:
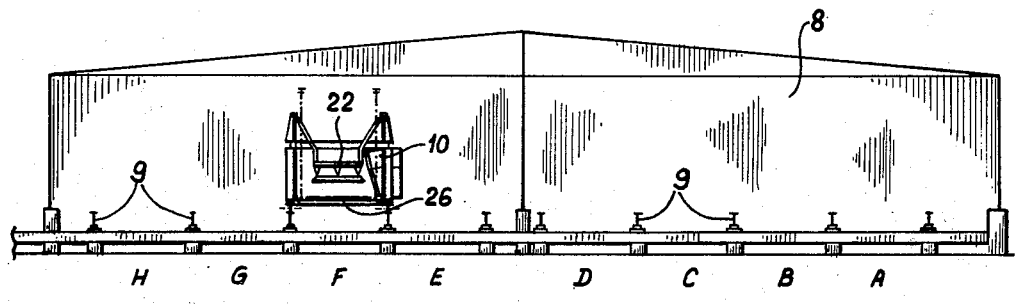
FIG. 2 is a cross section through the storage shed of the system according to FIG. 1 at a larger scale.

FIG. 2 represents a cross section of the storage shed 8. Of course, if so required, storage may also take place in the open air, but in view of protection from corrosion or for other reasons, it will be preferable generally to make use of a roof. As appears from FIG. 2, rails 9 extend in each passage A to H, three rails 9 being used time for two passages. These rails 9 form the support for a so-called magnet vehicle 10.

A pair of rails (not shown in the drawing) equally extends in the passage 7. These rails extend perpendicularly to the rails 9 in the passages of the storage shed 8. A so-called transfer vehicle can move over the rails in the passage 7.

Figure 3:
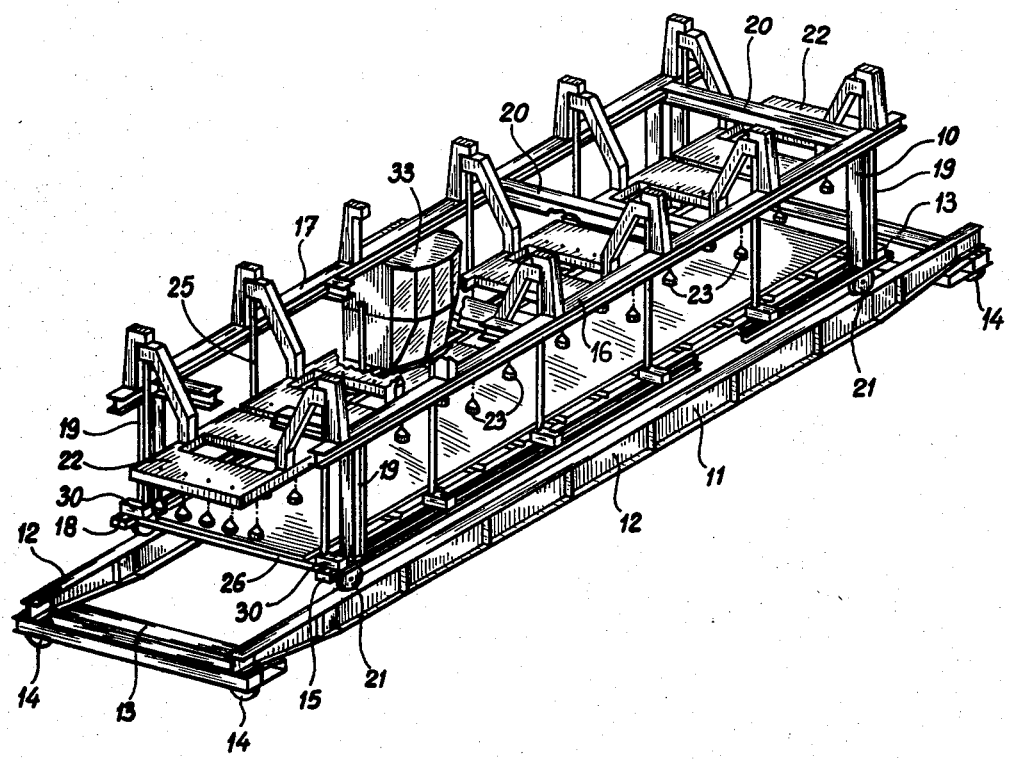
FIG. 3 is a perspective view of a transfer vehicle having on top of it a magnet vehicle and a sheet collector in the position for transportation, belonging to the system according to the invention.

A more detailed view of this transfer vehicle 11 is given in FIG. 3. This vehicle consists of a rectangular open frame with longitudinal girders 12 and transverse girders 13. The frame of the transfer vehicle 11 is supported by wheels 14 movable over the rails in the passage 7.

Likewise non-represented rails are mounted upon the longitudinal girders 12, on a level with the rails 9.

It will be understood that the magnet vehicle 10 can be placed upon the transfer vehicle 11 and then moved along the passage 7. When the transfer vehicle 11 comes to a standstill in front of a certain passage, the magnet vehicle 10 can again move off the transfer vehicle 11 and be displaced over the rails 9 of this passage. It will be clear that, in this manner, any point in any passage of the storage shed 8 is within reach.

Figure 4:
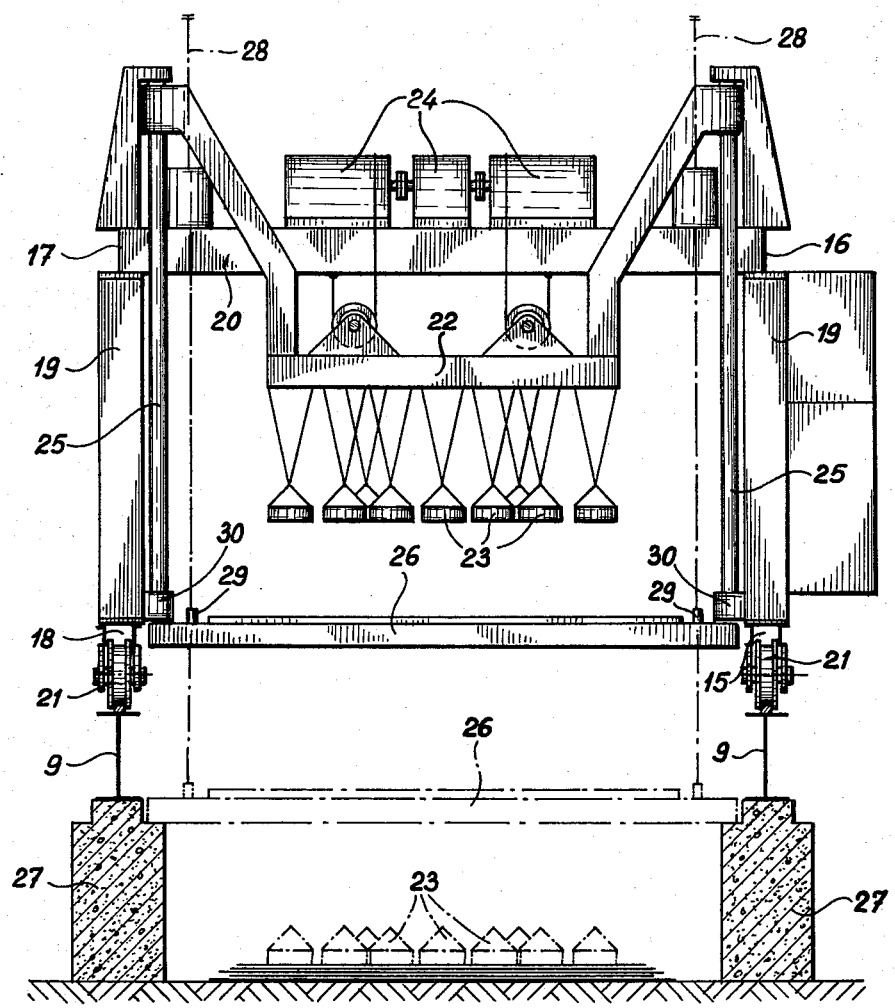
FIG. 4 is a cross section through FIG. 3.

The magnet vehicle 10 consists of a cage-like frame with an open lower side (see FIGS. 3 and 4). This frame is made up of four longitudinal girders 15, 16, 17 and 18 in which vertical girders 19 extend between the longitudinal girders 15 and 16 and between the longitudinal girders 17 and 18, and horizontal transverse girders 20 between the longitudinal girders 16 and 17. The wheels 21 moving over the rails 9 are supported in the frame.

Figure 5:
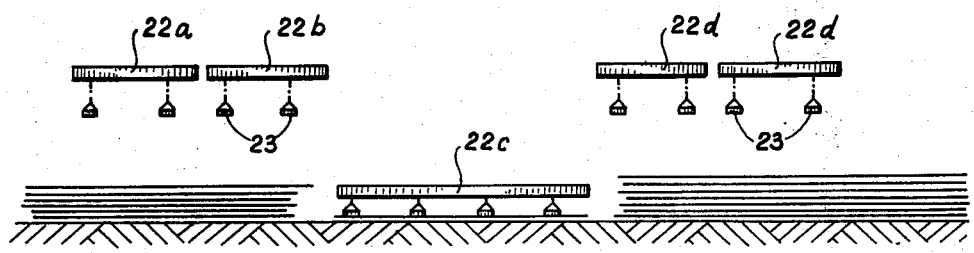
FIGS. 5 and 6 are two schematic views of the functioning of a magnet beam sub-divided into sections.
Figure 6:
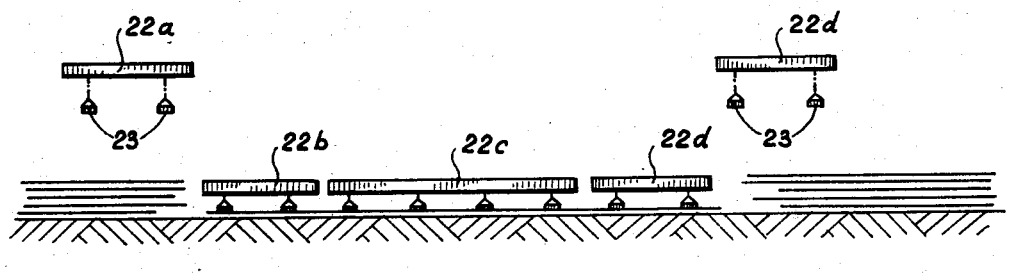

The magnet beam 22 is sheet-shaped and, according to the invention, sub-divided into a number of sections in the longitudinal direction of the magnet vehicle 10 (see also FIGS. 5 and 6). Each section can be moved up and down with respect to the frame of the magnet vehicle. The lifting means for the upward and downward motion of each section are shown in FIG. 4 and consist of a winch with hoisting ropes (24) in the known manner. In order to prevent the section of the magnet beam 22 from oslcillating with respect to the magnet vehicle 10, each section is directed along vertical guide rods marked with 25.

A sheet collector 26 is also shown in FIGS. 3 and 4.

As appears from FIG. 4, the rails 9 are mounted on small walls 27, the upper edge of which is stepped so as to receive the longitudinal edges of a sheet collector 26 in the idle position. This idle position is marked with dot-and-dash lines in FIG. 4. The sheet collector 26 can be lifted when the magnet vehicle 10 is situated over the sheet collector 26. For this purpose, a number of driving mechanism for threaded spindles 28 is present in the magnet vehicle 10. These threaded spindles 28 are marked with a dot-and-dash line in FIGS. 2 and 4. The lower ends of the threaded spindles can be connected with fastening members 29 at the upper end of the sheet collector 26. In this manner, it will be possible to move the sheet collector 26 upwards into the position for transportation marked with full lines in FIG. 4, in which the longitudinal edges of the sheet collector 26 are adjacent to the lower side of members 30 of the frame of the magnet vehicle 10. In this manner, the sheet collector 26 can be conveyed with the magnet vehicle 10.

From FIG. 4 it appears that, even with the sheet collector 26 in the idle position, there will be sufficient capacity under it to receive a stack of sheets with a considerable height. In FIG. 4 dot-and-dash lines indicate how the uppermost sheet from the said stack can be lifted by means of the magnet heads 23. It goes without saying that this will be possible only when the magnet vehicle 10 carries no sheet collector 26.

As appears from FIG. 1 a fixed roller conveyor 31 is mounted in one of the passages of the storage shed 8, said conveyor being connected to a fixed roller conveyor 32 outside the storage shed 8 carrying off the sheets to the ship-yard.

When a sheet is lying on the roller conveyor 6, the transfer vehicle 11 with the magnet vehicle 10 upon it will be placed over the conveyor 6. By means of the magnet heads 23, the sheet is lifted through the frame of the transfer vehicle 11, after which the whole is placed opposite the required passage. Thereupon, the magnet vehicle 10 with the sheet hung inside enters the passage as far as the required place, after which the magnet beam 22 is lowered so as to deposit the sheet upon the floor between the rails 9. In this manner, the sheet supplied can be deposited in a desired place of the storage shed one by one, with the possibility of collecting a number of matching sheets into a stack.

It will be possible to automate the storage by means of a computer. The measuring and marking system 5 can transmit the data of the sheet moved past to the computer which will then control the motions of the transfer vehicle 11 and of the magnet vehicle 10. Furthermore, the computer can be used for registration of the store of each sheet. In this manner, each separate sheet can be rapidly traced. In fact, however, a storage system operating with the aid of a computer is known per se.

When one or more sheets should be conveyed to the ship-yard from the storage shed 8, one or more sheet collectors 26 are either set up in a passage next to the passage from which the sheets should be received or in the passage next to the fixed conveyor 31. With the aid of the magnet vehicle 10 and, as the case may be, with the aid of the transfer vehicle 11, when sheets should be taken from other passages, the sheets are then placed upon a sheet collector 26 one by one. In this manner, a stack of sheets of the required combination is formed. When the required stack is built up, the magnet vehicle 10 is placed over the sheet collector 26 and moved as far as over the roller conveyor 31, after which the sheet collecter 26 with the stack of sheets upon it is put down upon the roller conveyor 31 and carried off to the roller conveyor 32.

The sheet collectors 26 may also be used for sorting of a stack of sheets. When, for instance, a stack of sheets of a certain combination is situated in a certain passage, and only one of these sheets should be taken right out of the middle of the stack to be carried off to the ship-yard, the sheets are transferred to a sheet collector 26 one by one by means of the magnet vehicle 10 until the required sheet is attained. This sheet is then deposited upon the still empty sheet collector 26. This sheet may be carried off in a known manner with the aid of the magnet vehicle 10 and, as the case may be, of the transfer vehicle 11. When more sheets are involved, the sheet collector 26 is also moved along. The sheets on the other sheet collector 26 are again deposited in their place in the respective passage in the known manner.

FIGS. 5 and 6 show the action of the magnet beam 22 subdivided into sections. The sections are marked here with 22a, 22b, 22c, 22d and 22e.

It will be obvious, in FIGS. 5 and 6, how one or more sections may be used to lift or to lower certain sheets. In this manner, a more effective use is made of the space in the passages and the sheets can close up better longitudinally.

Although this is not shown in the drawing, it will be clear that the magnet vehicle 10 and the transfer vehicle 11 are fitted with driving gear.

The magnet vehicle 10 has a driver cabin for the operator.

From the foregoing description of a preferred embodiment, the artisan will appreciate that the invention provides a conveying and storage system for sheet material and the like. While the invention has been described in terms of the handling of metallic, magnetic-material sheets, panel structures of metals, and non-metallic materials as well as composites thereof can also be considered to fall within the category of "sheet material", it being only necessary to replace the magnet heads 23 with other types of zipping devices well known in the art (not shown) in order to lift and and handle non-magnetic materials.

The system of the invention basically comprises a plurality of parallel rails 9 positioned each with an end located along a predetermined transfer path 7 and defining a corresponding plurality of elongated sheet storage passages 8A-8H, each passage 8A-8H extended lengthwise from the transfer path 7 and between a respective pair of rails 9,; a first vehicle 11 moveable along the transfer path 7; a second vehicle, the "magnet vehicle" 10 carried by the first vehicle 11, this vehicle 10 being moveable between vehicle 11 and and a pair of rails 9 corresponding to a selected storage passage 8A-8H, the vehicle 10 being moveable upon and along such pair of rails 9 to carry sheet material between the selected storage passage 8A-8H and the vehicle 11; and lifting means including the magnet beam or platform 22 carried by the vehicle 10 and operable to engage and support sheet material to be carried thereby, such generalized lifting means including grippers 23 moveable vertically relative to the vehicle 10 to lift sheet material in the selected storage passage 8A-8H upwardly for carrying, and to lower sheet material carried to deposit same in the selected storage passage 8A-8H.

The sheet collector 26 used in the invention can be generally considered and serves as a support platform that is carried by the vehicle 10 for supporting sheet material. This collector or platform 26 is vertically moveable via means 28, 29, relative to the vehicle 10 and is detachable therefrom to allow the platform 26 to be stationed at a given location to receive sheet material carried from elsewhere by the vehicle 10 and deposited thereby on the platform at its stationed location.

I claim:

1. A conveying and storage system for sheet material and the like, which comprises a plurality of parallel rails positioned each with an end located along a predetermined transfer path and defining a corresponding plurality of elongated sheet storage passages, each passage extending lengthwise from said transfer path between a respective pair of said rails; a first vehicle moveable along said transfer path; a second vehicle carried by said first vehicle, said second vehicle being moveable between said first vehicle and a pair of said rails corresponding to a selected storage passage, said second vehicle being moveable upon and along said pair of rails to carry sheet material between the selected storage passage and said first vehicle; and lifting means carried by said second vehicle and operable to engage and support sheet material to be carried thereby, said lifting means including grippers moveable vertically relative to the second vehicle to lift sheet material in the selected storage passage upwardly for carrying, and to lower sheet material carried to deposit same in the selected storage passage; a support platform carried by said second vehicle for supporting sheet material, said support platform being vertically moveable relative to said second vehicle and detachable therefrom to allow said support platform to be stationed at a given location to receive sheet material carried from elsewhere by said second vehicle and deposited thereby on said support platform at said location.

2. A conveying and storage system according to claim 1 including a plurality of vertically extending walls positioned to extend along respective storage passages, each wall supporting a corresponding one of said rails and having means to engage a part of said support platform for supporting same between the pair of walls associated with the respective storage passage.

3. A conveying and storage system for sheet material and the like, which comprises a plurality of parallel rails positioned each with an end located along a predetermined transfer path and defining a corresponding plurality of elongated sheet storage passages, each passage extending lengthwise from said transfer path between a respective pair of said rails; a first vehicle moveable along said transfer path; a second vehicle carried by said first vehicle, said second vehicle being moveable between said first vehicle and a pair of said rails corresponding to a selected storage passage, said second vehicle being moveable upon and along said pair of rails to carry sheet material between the selected storage passage and said first vehicle; and lifting means carried by said second vehicle and operable to engage and support sheet material to be carried thereby, said lifting means including grippers moveable vertically relative to the second vehicle to lift sheet material in the selected storage passage upwardly for carrying, and to lower sheet material carried to deposit same in the selected storage passage; said first vehicle having a first pair of parallel girders connected at opposite ends by respective girders of a second pair of girders to define a generally rectangular open frame through which said sheet material can be passed.

4. A conveying and storage system according to claim 3 wherein said parallel girders of the first vehicle are oriented generally parallel to said rails and said second vehicle travels in a direction generally parallel to said parallel girders when moving from said first vehicle onto a pair of said rails.

* * * * *